UNITED STATES PATENT OFFICE.

ROBERT A. HOLBROOK, OF CHICAGO HEIGHTS, ILLINOIS, ASSIGNOR TO VICTOR CHEMICAL WORKS, OF CHICAGO, ILLINOIS, A CORPORATION OF ILLINOIS.

BAKING PREPARATION.

1,113,632. Specification of Letters Patent. Patented Oct. 13, 1914.

No Drawing. Application filed December 15, 1913. Serial No. 806,747.

*To all whom it may concern:*

Be it known that I, ROBERT A. HOLBROOK, a citizen of the United States, and a resident of Chicago Heights, county of Cook, and State of Illinois, have invented certain new and useful Improvements in Baking Preparations, of which the following is declared to be a full, clear, and exact description.

The invention relates to improvements in baking preparations and, more particularly, to so-called "baking acids", which react with a carbonate or bi-carbonate to liberate the leavening carbonic acid gas.

At present mono-calcium phosphate is largely used as a baking acid because of its wholesomeness and low cost, but, while satisfactory for household purposes, it is not well adapted for use in bakeries where the dough is often mixed in large quantities and allowed to stand for some considerable time before it is all baked. Under such circumstances, some of the leavening gas appears to be dissipated to a greater or less extent, as is evidenced by the less satisfactory character of the goods baked from such dough.

The present invention seeks to provide an improved baking preparation of low cost and free from unwholesome ingredients, and which will produce a large loaf volume of good texture, even though the wet dough be allowed to stand for some time before baking.

Practical experiment has shown that the desired result is attained by employing, in the baking preparation, mono-calcium phosphate admixed with a di-alkali phosphate, and preferably di-sodium phosphate. If, for example, a baking acid comprising 6 parts, by weight, of mono-calcium phosphate and 4 parts of a suitable diluent such as starch, is compared with one comprising 6 parts of mono-calcium phosphate, 1 part of starch and 3 parts of anhydrous di-sodium phosphate, it will be found that, while each has substantially the same neutralizing value, the latter will produce superior baking results, particularly if the wet dough is allowed to stand for several hours before heat is applied.

While di-sodium phosphate alone will not react with sodium bi-carbonate, it does combine in solution with mono-calcium phosphate to produce mono-sodium phosphate, and the latter, as well as the mono-calcium phosphate, react with the bi-carbonate to generate carbonic acid gas, substantially as indicated in the following equations:—

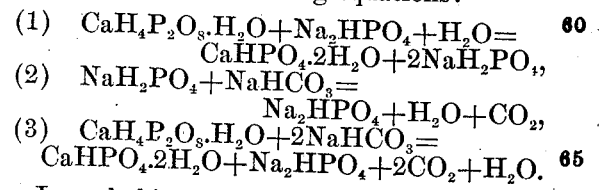

(1) $CaH_4P_2O_8.H_2O + Na_2HPO_4 + H_2O =$
$CaHPO_4.2H_2O + 2NaH_2PO_4,$
(2) $NaH_2PO_4 + NaHCO_3 =$
$Na_2HPO_4 + H_2O + CO_2,$
(3) $CaH_4P_2O_8.H_2O + 2NaHCO_3 =$
$CaHPO_4.2H_2O + Na_2HPO_4 + 2CO_2 + H_2O.$

In a baking compound prepared in accordance with the present invention and containing sodium bi-carbonate, mono-calcium phosphate and an admixture of di-sodium phosphate, it is believed that all three of the foregoing reactions take place simultaneously in the wet dough, the resultant products being di-calcium phosphate, di-sodium phosphate and carbonic acid gas.

It should be noted that mono-sodium phosphate is formed in the nascent state in the dough, and it is found that, while di-sodium phosphate is cheap and efficient, any salt of an alkali may be substituted therefor in the preparation, which can be safely employed in a baking compound and which will react with mono-calcium phosphate to form a mono-alkali phosphate, and such a compound is formed when the reaction produces a calcium compound having a relatively small solubility as compared to the mono-calcium phosphate. Among such salts of alkalis which have practical value as substitutes for the di-sodium phosphate, are the primary and secondary sulfates, the meta-phosphates, the pyro-phosphates, the primary and secondary tartrates, and the primary, secondary and tertiary citrates.

The invention is not limited to any definite proportion of such an alkali salt as compared to the amount of mono-calcium phosphate used in the mixture, but preferably the relative proportions of alkali salt and mono-calcium phosphate correspond to the amounts that would complete the reaction between them.

Obviously, the improved baking preparation may take the form of a baking powder or baking acid or of a "self-raising" flour, or the form of a wet dough mixed ready for baking. In a wet dough mixture, the alkali salt employed may be in the hydrated form. But, in a baking powder or baking acid or in a self-raising flour, the alkali salt used should be non-hydroscopic, that is to say, such that moisture absorbed by it will not be retained as free or uncombined water. For example, in such stable baking preparations, di-sodium phosphate which has been dehydrated to some extent, and which is preferably substantially anhydrous, is employed, since absorbed moisture unites chemically therewith as water of crystallization and does not therefore act prematurely to decrease the gas-producing or leavening capacity of the preparation.

In preparing baking powder or baking acid, the materials and relative percentages, by weight, are preferably as follows:

| Materials. | Baking powder. | Baking acid. |
|---|---|---|
| Mono-calcium phosphate | 30% | 60% |
| Di-sodium phosphate (anhydrous) | 15% | 30% |
| Starch | 30% | 10% |
| Sodium bi-carbonate | 25% | |

It is obvious that the proportions above given, and particularly the amount of starch or other diluent employed may be varied and other changes made in the details set forth, without departure from the essentials of the invention as defined in the claims.

While sodium bi-carbonate is usually employed, other carbonates, suitable for baking preparations, may be substituted therefor.

I claim as my invention—

1. A baking preparation including in its composition a suitable carbonate, mono-calcium phosphate, and an alkali salt which will react, in a mixed dough, with the mono-calcium phosphate to form a mono-alkali phosphate.

2. A baking preparation including in its composition a suitable carbonate, mono-calcium phosphate and a di-alkali phosphate.

3. A baking preparation including in its composition a suitable carbonate, mono-calcium phosphate and di-sodium phosphate.

4. A baking acid comprising mono-calcium phosphate admixed with an alkali salt which will react in solution therewith to form a mono-alkali phosphate.

5. A baking acid comprising mono-calcium phosphate admixed with di-sodium phosphate.

6. A baking powder comprising an admixture of a suitable carbonate, mono-calcium phosphate, and a non-hydroscopic alkali salt which will react in solution with mono-calcium phosphate to form a mono-alkali phosphate.

7. A baking powder comprising an admixture of suitable carbonate, mono-calcium phosphate and anhydrous di-sodium phosphate.

8. A baking acid comprising an admixture of mono-calcium phosphate and anhydrous di-sodium phosphate.

ROBERT A. HOLBROOK.

Witnesses:
ELEANOR HAGENOW,
HARRY L. CLAPP.